United States Patent [19]

Yamazaki et al.

[11] Patent Number: 5,754,504

[45] Date of Patent: May 19, 1998

[54] DEVICE FOR RECORDING OR REPRODUCING INFORMATION ON AN OPTICAL RECORDING MEDIUM HAVING AN OBJECTIVE LENS WITH AN ASTIGMATISM PRODUCING OFF OPTICAL AXIS MINIMUM TOTAL ASTIGMATISM POSITION TO CORRECT TRACKING ASTIGMATISM

[75] Inventors: Hiroyuki Yamazaki; Takashi Matsumaru, both of Tokyo, Japan

[73] Assignee: Konica Corporation, Tokyo, Japan

[21] Appl. No.: 552,291

[22] Filed: Nov. 2, 1995

[30] Foreign Application Priority Data

Nov. 10, 1994 [JP] Japan ................................ 6-276667

[51] Int. Cl.$^6$ ........................................... G11B 7/095
[52] U.S. Cl. ........................................ 369/44.23; 369/112
[58] Field of Search ............................. 369/44.23, 112

[56] References Cited

U.S. PATENT DOCUMENTS

| 4,782,474 | 11/1988 | Arai et al. ................ 369/44.34 X |
| 4,789,978 | 12/1988 | Shikama et al. ................ 369/112 |
| 4,842,388 | 6/1989 | Tanaka et al. . | |

FOREIGN PATENT DOCUMENTS 0 226 403   6/1987   European Pat. Off. .

6-48543   6/1994   Japan .

OTHER PUBLICATIONS

Patent Abstracts of Japan, vol. 7, No. 127, (P–201), Jun. 3, 1983 & JP 58–45629.

Shigeo Kubota, An Analysis of Eye Diagram Phase Jitter in Optical Disk Systems III, *Japanese Journal of Optics*, Apr., 1985, vol. 14, pp. 140(64)–143(67).

*Primary Examiner*—W. R. Young
*Attorney, Agent, or Firm*—Finnegan, Henderson, Farabow, Garrett & Dunner, L.L.P.

[57] ABSTRACT

A device for recording and reproducing on an optical information recording medium, includes a light source composed of a semiconductor laser to emit a divergent luminous flux; an objective lens to receive the divergent luminous flux and to converge the divergent luminous flux onto the optical information recording medium; and a tracker for tracking a converged luminous flux on the optical information recording medium by moving the objective lens in a direction perpendicular to an optical axis. The objective lens has an astigmatism so that a quantity of the astigmatism of a wavefront emitted from the objective lens shows a minimum value at a position where the objective lens is moved in the direction perpendicular to the optical axis by a tracking operation of the tracker.

19 Claims, 9 Drawing Sheets

DEVICE FOR RECORDING OR REPRODUCING INFORMATION ON AN OPTICAL RECORDING MEDIUM HAVING AN OBJECTIVE LENS WITH AN ASTIGMATISM PRODUCING OFF OPTICAL AXIS MINIMUM TOTAL ASTIGMATISM POSITION TO CORRECT TRACKING ASTIGMATISM

BACKGROUND OF THE INVENTION

The present invention relates to a recording and reproducing device for recording and reproducing optical information on a recording medium by conducting tracking in which an objective lens for converging a ray of incident diffusion light upon an optical information recording medium is moved in a direction perpendicular to the optical axis, and also the present invention relates to an objective lens for recording and reproducing optical information on a recording medium.

Figure 1:
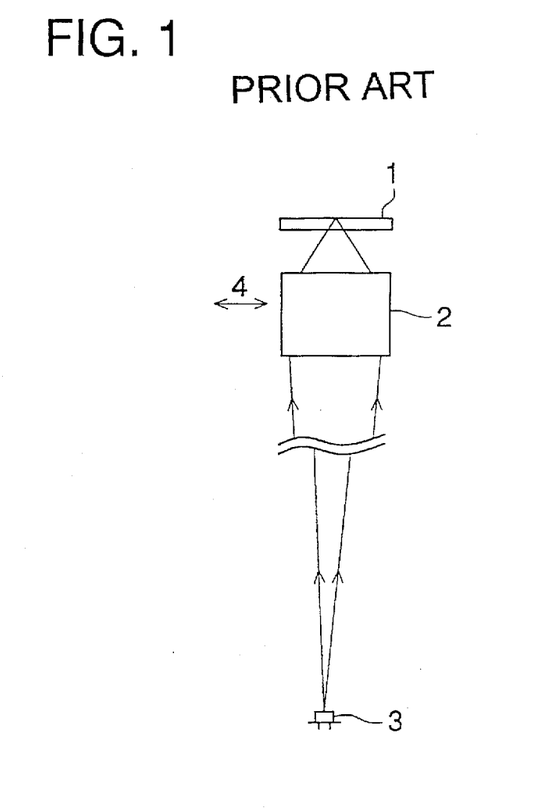
FIG. 1 is a view showing an optical system used for the recording and reproducing device for recording and reproducing optical information on a recording medium.

FIG. 1 is a view showing the most common optical system used for recording and reproducing optical information on a recording medium such as an optical disk. In this optical system, a ray of light emitted from the light source 3 is directly converged upon the information recording face 1 by the objective lens 2. In FIG. 1, the arrow 4 indicates a tracking direction. Due to the eccentricity of an optical disk and the deviation of a rotational shaft, the track is caused to deviate. Accordingly, in order to prevent the derailment of a laser beam spot from the track, the laser beam spot is moved in a radial direction of the optical disk so that the normal track can be detected. This operation is commonly referred to as tracking.

In the optical system shown in FIG. 1 in which a finite conjugate type objective lens is used, tracking is conducted in such a manner that the objective lens is moved in a direction perpendicular to the optical axis. That is, off-axis light is used. Consequently, it is required to use an objective lens in which both off-axis aberration and on-axis aberration are accurately compensated. Usually, the cost and weight of an objective lens used for an optical disk are restricted. Therefore, a perfect aplanat aspherical single lens is frequently used for the objective lens. In this case, off-axis aberration is determined by astigmatism, the quantity of which is increased in the manner of a quadratic function of the image height. In this case, astigmatism is caused, in which the converging point of a ray of light on the tangential image plane is formed on the front side of the converging point of a ray of light on the sagittal image plane, that is, the converging point of a ray of light on the tangential image plane is formed on the objective lens side.

A gain wave-guide type semiconductor laser is commonly used for the light source of an optical system provided in the recording and reproducing device for recording and reproducing optical information on a recording medium such as an optical disk. In this laser, positions of a light emitting point in the vertical and horizontal directions deviate from each other on the hetero-joint plane, that is, there is an astigmatic difference. Commonly, in order to prevent the occurrence of cross talk between adjacent tracks, the device is composed in such a manner that the horizontal joint direction, in which the strength of the diffusion ring is reduced, coincides with the radial direction of the optical disk. In this case, a converging point of light on the plane formed between the normal line and the radial line of the optical disk, is formed in the front of the converging point of light on a plane perpendicular to it, that is, on the objective lens side. In this connection, a method of removing an influence of the astigmatic difference of the semiconductor laser is described on pages 64 to 67 of the volume 14 of No. 2 of "OPTICS" published in April of 1985. However, from the viewpoint of reduction of the cost, it is common to use the semiconductor laser having an astigmatic difference.

As described above, due to the astigmatism caused by tracking, the converging point of light on the plane formed by the normal line and the radial line of an optical disk is formed in the front of the converging point of light on the plane perpendicular to it, that is, on the objective lens side. Further, in the case where the semiconductor laser having an astigmatic difference is used, due to the astigmatism caused by tracking and also due to the astigmatism caused by the astigmatic difference of the semiconductor laser, the converging point of light on the plane formed between the normal line and the radial line of the optical disk is formed in the front of the converging point of light on the plane perpendicular to it, that is, on the objective lens side. Consequently, in the overall optical system, quantities of the astigmatism are totaled.

Figure 2:
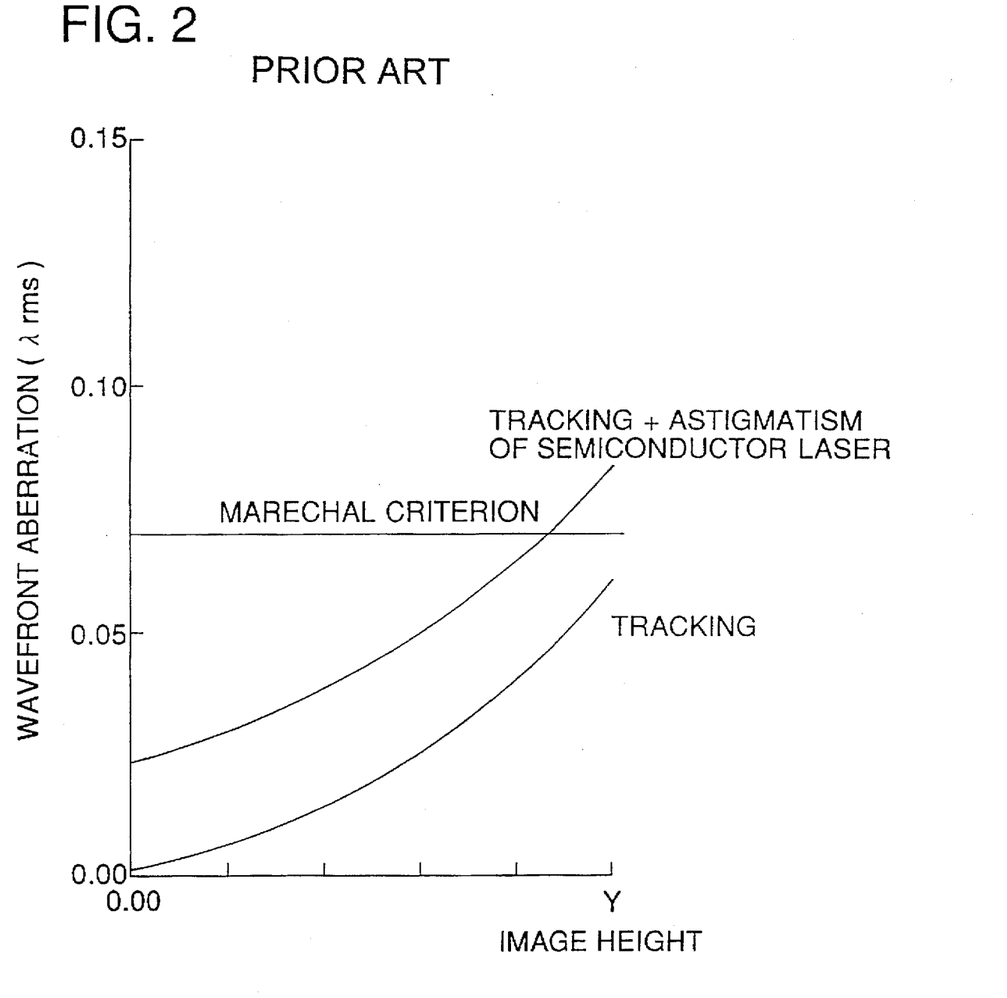
FIG. 2 is a view showing the astigmatism caused in the prior art.

In FIG. 2, the astigmatism caused by tracking is shown, and also the astigmatism in which the astigmatism caused by tracking and the astigmatism caused by the semiconductor laser are totaled is shown. In the case shown in FIG. 2, when a semiconductor laser having no astigmatic difference is used, only the astigmatism caused by tracking is the actual astigmatism caused in the condition of practical use. When a semiconductor laser having an astigmatic difference is used, the astigmatism including the astigmatism caused by the semiconductor laser is the actual astigmatism caused in the condition of practical use. At high image height position, a quantity of the wave front astigmatism exceeds 0.07 λrms, that is, a quantity of the wave front astigmatism exceeds the Marechal Criterion which is a limit for reading in a normal condition.

An attempt has been made so as to compensate the astigmatism in the optical system used for the recording and reproducing device for recording and reproducing optical information on a recording medium such as an optical disk. For example, Japanese Patent Publication No. 48543/1994 discloses the technique. According to the technique disclosed in the above patent publication, the astigmatism of the objective lens and the astigmatism of other optical elements composing the optical system are compensated to each other, so that the entire astigmatism on the optical axis of the optical system can be minimized. Accordingly, in the case where the objective lens is moved in a direction perpendicular to the optical axis for the purpose of tracking, the astigmatism is caused from the reasons described above, and the astigmatism caused by this tracking operation is not compensated.

SUMMARY OF THE INVENTION

It is an object of the present invention to provide a recording and reproducing device for recording and reproducing optical information on a recording medium such as an optical disk, characterized in that the astigmatism is excellently compensated in the overall tracking range. It is also an object of the present invention to provide an objective lens used for the recording and reproducing device.

Structure 1 of the present invention to accomplish the above object will be described as follows. The recording and reproducing device comprises: a light source composed of a semiconductor laser; and an objective lens upon which a luminous flux emitted from the light source is incident as a divergent luminous flux, the objective lens converging the divergent luminous flux upon a recording medium for recording optical information. In the recording and reproducing device, when the objective lens is moved in a direction perpendicular to the optical axis with respect to the above light source so as to conduct tracking. In the objective lens of the recording and reproducing device, the astigmatism is caused so that a quantity of the astigmatism of the wave front emergent from the objective lens can be minimized at a position separate from the optical axis when the objective lens deviates from the axis in the process of tracking.

Structure 2: In the structure 1, the minimum value of the quantity of astigmatism of the wave front emergent from the objective lens is generated in a tracking range from 0.30 Y to 0.95 Y, wherein Y is the maximum image height of the objective lens at the maximum tracking quantity.

Structure 3: In the structure 1, the minimum value of the quantity of astigmatism of the wave front emergent from the objective lens is generated in a tracking range from 0.40 Y to 0.90 Y, wherein Y is the maximum image height of the objective lens at the maximum tracking quantity.

Structure 4: In the structure 1, the minimum value of the quantity of astigmatism of the wave front emergent from the objective lens is generated in a tracking range from 0.60 Y to 0.80 Y, wherein Y is the maximum image height of the objective lens at the maximum tracking quantity.

Structure 5: In the structure 1, the semiconductor laser is provided with an astigmatic difference.

Structure 6: In the structure 1, the semiconductor laser is provided with an astigmatic difference; and a plane formed between a radial line perpendicular to the optical axis in which the objective lens is moved for tracking and the optical axis of the objective lens, is parallel to the hetero-joint plane.

Structure 7: In the structure 1, the objective lens is a finite conjugate type bi-aspherical single lens.

Structure 8: In the structure 1, the objective lens is a finite conjugate type bi-aspherical single lens manufactured by means of molding.

Structure 9: In the structure 7, the objective lens is composed so that the astigmatism of the objective lens is generated when a section of at least one of the planes of the objective lens is different from a section perpendicular to it.

Structure 10: In the structure 8, the astigmatism of the objective lens is generated by the birefringence caused in the process of resin molding.

Structure 11: In the structure 8, the astigmatism of the objective lens is generated by the birefringence caused in the process of resin molding and also the astigmatism of the objective lens is generated when a section of at least one of the planes of the objective lens is different from a section perpendicular to it.

Structure 12, which includes Structure 1, to accomplish the above object will be described as follows. The recording and reproducing device comprises: a light source composed of a semiconductor laser; and an objective lens upon which a luminous flux emitted from the light source is incident as a divergent luminous flux, the objective lens converging the divergent luminous flux upon a recording medium for recording optical information. In the recording and reproducing device, the objective lens is moved in a direction perpendicular to the optical axis with respect to the above light source so as to conduct tracking. In the objective lens of the recording and reproducing device, the astigmatism is caused. Further, the rotational position of the objective lens around the optical axis is determined so that a quantity of the astigmatism of the wave front emergent from the objective lens can be minimized at a position separate from the optical axis when the objective lens deviates from the axis in the process of tracking.

Structure 13, which includes Structure 1, to accomplish the above object will be described as follows. The recording and reproducing device for recording and reproducing optical information on a recording medium comprises: a semiconductor laser used as a light source; and a finite conjugate type objective lens for converging an emergent luminous flux emitted from the semiconductor laser. The above objective lens is a positive single lens, the concave face of which is directed onto the light source side, wherein both faces on the light source and image sides are formed to be aspherical. The objective lens is moved for tracking in a direction perpendicular to the optical axis. A face formed by the moving direction and the optical axis, and a hetero-joint plane of the semiconductor laser are approximately on the same face. A quantity of astigmatism on the optical axis of the objective lens satisfies the following expression. The apparatus is assembled in a direction so that the astigmatism of the objective lens can cancel the astigmatism generated by the semiconductor laser and tracking.

$$\frac{1}{\sqrt{6}} \times \frac{1}{2} \cdot N' \cdot \theta'^2 \times \frac{N'}{N} \cdot m'^2 \cdot \Delta X/\lambda + \Delta AS_{(0.4Y)} \leq AS_{LENS} \leq$$

$$\frac{1}{\sqrt{6}} \times \frac{1}{2} \cdot N' \cdot \theta'^2 \times \frac{N'}{N} \cdot m'^2 \cdot \Delta X/\lambda + \Delta AS_{(0.9Y)}$$

$\theta' = \sin^{-1}(NA')$

NA': Numerical aperture of the objective lens on the image side

N': Index of refraction of the medium on the image side

N: Index of refraction of the medium on the object side m': Lateral magnification of the objective lens $\Delta X$: Half of the astigmatic difference of the semiconductor laser (μm)

$\lambda$: Wave-length of the semiconductor laser (μm)

$\Delta AS(0.4\ Y)$, $\Delta AS(0.9\ Y)$: Quantites of the astigmatism respectively generated by tracking at the image heights 0.4 Y and 0.9 Y (WEF·λrms)

Y: Maximum image height by tracking (mm)

$AS_{LENS}$: Astigmatism on-axis of the objective lens itself (WEF·λrms)

Structure 14, which includes Structure 1, will be described as follows. A divergent luminous flux emergent from the light source composed of a semiconductor laser is incident upon the objective lens. The divergent luminous flux is converged by the objective lens upon a recording medium for recording information. When the objective lens is moved with respect to the light source in a direction perpendicular to the optical axis. The above objective lens is characterized in that: astigmatism is caused by the objective lens so that the minimum value of the quantity of astigmatism of the emergent wave front can be generated by tracking at a position separate from the optical axis.

According to the Structure 1 of the present invention, in the objective lens of the recording and reproducing device, the astigmatism is caused so that a quantity of the astigmatism of the wave front emergent from the objective lens can be minimized at a position separate from the optical axis when the objective lens deviates from the axis in the process of tracking. Accordingly, a quantity of astigmatism caused by tracking can be reduced in the overall range of tracking. Accordingly, even when the objective lens is moved from the optical axis in the process of tracking, optical information is recorded and reproduced under the condition that the astigmatism is excellently compensated.

According to the Structure 2 of the present invention, the minimum value of the quantity of astigmatism of the wave front emergent from the objective lens is generated in a tracking range from 0.30 Y to 0.95 Y, wherein Y is the maximum image height of the objective lens at the maximum tracking quantity. Accordingly, the maximum quantity of astigmatism caused only by tracking can be reduced by about 10%.

According to the Structure 3 of the present invention, the minimum value of the quantity of astigmatism of the wave front emergent from the objective lens is generated in a tracking range from 0.40 Y to 0.90 Y, wherein Y is the maximum image height of the objective lens at the maximum tracking quantity. Accordingly, the maximum quantity of astigmatism caused only by tracking can be reduced by about 20%.

According to the Structure 4 of the present invention, the minimum value of the quantity of astigmatism of the wave front emergent from the objective lens is generated in a tracking range from 0.60 Y to 0.80 Y, wherein Y is the maximum image height of the objective lens at the maximum tracking quantity. Accordingly, the maximum quantity of astigmatism caused only by tracking can be reduced by about 36%.

According to the Structure 5 of the present invention, the semiconductor laser is provided with an astigmatic difference. Therefore, it is possible to use an inexpensive semiconductor laser.

According to the Structure 6 of the present invention, the semiconductor laser is provided with an astigmatic difference; and a plane formed between a radial line perpendicular to the optical axis in which the objective lens is moved for tacking and the optical axis of the objective lens, is parallel to the hetero-joint plane. Therefore, it is possible to prevent the occurrence of cross talk between the tracks adjacent to each other.

According to the Structure 7 of the present invention, the objective lens is a finite conjugate type bi-aspherical single lens. Accordingly, it is possible to provide a recording and reproducing device for recording and reproducing optical information on a recording medium, the weight of which is light, and the cost of which is low.

According to the Structure 8 of the present invention, the objective lens is a finite conjugate type bi-aspherical single lens manufactured by means of molding. Therefore, the cost of the recording and reproducing device for recording and reproducing optical information on a recording medium can be further reduced.

According to the Structure 9 of the present invention, the objective lens is composed so that the astigmatism of the objective lens is generated when a section of at least one of the planes of the objective lens is different from a section perpendicular to it. Therefore, no optical elements except for the objective lens are necessary for generating the astigmatism. Accordingly, it is possible to provide a light and compact recording and reproducing device for recording and reproducing optical information on a recording medium.

According to the Structure 10 of the present invention, the astigmatism of the objective lens is generated by the birefringence caused in the process of resin molding. Therefore, no optical elements except for the objective lens are necessary for generating the astigmatism. Accordingly, it is possible to provide a light, compact and inexpensive recording and reproducing device for recording and reproducing optical information on a recording medium.

According to the Structure 11 of the present invention, the astigmatism of the objective lens is generated by the birefringence caused in the process of resin molding and also the astigmatism of the objective lens is generated when a section of at least one of the planes of the objective lens is different from a section perpendicular to it. Therefore, no optical elements except for the objective lens are necessary for generating the astigmatism. Accordingly, it is possible to provide a light and compact recording and reproducing device for recording and reproducing optical information on a recording medium.

According to the Structure 12 of the present invention, in the objective lens of the recording and reproducing device, the astigmatism is caused. Further, the rotational position of the objective lens around the optical axis is determined so that a quantity of the astigmatism of the wave front emergent from the objective lens can be minimized at a position separate from the optical axis when the objective lens deviates from the axis in the process of tracking. Therefore, a quantity of astigmatism caused by tracking can be reduced in the overall tracking range. Accordingly, even when the objective lens is moved from the optical axis in the process of tracking, the astigmatism can be excellently compensated in the recording and reproducing device.

According to the Structure 13 of the present invention, the objective lens is a positive single lens, the concave face of which is directed onto the light source side, wherein both faces on the light source and image sides are formed to be aspherical. The objective lens is moved for tracking in a direction perpendicular to the optical axis. A face formed by the moving direction and the optical axis, and a hetero-joint plane of the semiconductor laser are approximately on the same face. A quantity of astigmatism on the optical axis of the objective lens satisfies the following equation.

$$\frac{1}{\sqrt{6}} \times \frac{1}{2} \cdot N' \cdot \theta'^2 \times \frac{N'}{N} \cdot m'^2 \cdot \Delta X/\lambda + \Delta AS_{(0.4Y)} \leq AS_{LENS} \leq$$

$$\frac{1}{\sqrt{6}} \times \frac{1}{2} \cdot N' \cdot \theta'^2 \times \frac{N'}{N} \cdot m'^2 \cdot \Delta X/\lambda + \Delta AS_{(0.9Y)}$$

$\theta' = \sin^{-1}(NA')$

NA': Numerical aperture of the objective lens on the image side

N': Index of refraction of the medium on the image side

N: Index of refraction of the medium on the object side m': Lateral magnification of the objective lens $\Delta X$: Half of the astigmatic difference of the semiconductor laser (μm)

$\lambda$: Wave-length of the semiconductor laser (μm)

$\Delta AS_{(0.4 Y)}$, $\Delta AS_{(0.9 Y)}$: Quantites of the astigmatism respectively generated by tracking at the image heights 0.4 Y and 0.9 Y (WEF·λrms)

Y: Maximum image height by tracking (mm) height Y by tracking (mm)

$AS_{LENS}$: Astigmatism on-axis of the objective lens itself (WEF·λrms)

The apparatus is assembled so that the astigmatism of the objective lens can cancel the astigmatism generated by the semiconductor laser and tracking. Accordingly, it is possible to prevent the occurrence of cross talk. Further, the astigmatism caused by the semiconductor laser and the astigmatism caused by tracking can be compensated to each other. Therefore, even when the objective lens is moved from the optical axis in the process of tracking, the astigmatism can be excellently compensated in the recording and reproducing device for recording and reproducing optical information on a recording medium.

According to the Structure 14 of the present invention, astigmatism is caused by the objective lens so that the minimum value of the quantity of astigmatism of the emergent wave front can be generated by tracking at a position separate from the optical axis. Therefore, it is possible to provide an objective lens capable of compensating the astigmatism generated by tracking.

In the Structure 1 described above, it is preferable that the minimum value of astigmatism of the wave front emergent from the objective lens is generated at 0.70 Y, wherein Y is the maximum image height of the objective lens at the maximum quantity of tracking.

In any embodiment of the Structures 1 to 5, in the case where a finite conjugate type objective lens is used, a convex face of the objective lens is directed to the light source, and the objective lens is composed of a positive single lens, both faces of which, one is a light source side and the other is an image side, are formed to be aspherical, and a plane formed between the moving direction perpendicular to the optical axis for tracking and the optical axis forms an angle in the range of ±45° with respect to the hetero-joint plane. When the angle deviates from this range, the radial direction of the optical disk coincides with a direction in which the strength of the diffraction ring is increased. Accordingly, cross talk occurs. In this case, the astigmatism caused by fluctuation of the light emitting point of the semiconductor laser and the astigmatism caused by tracking occurs as follows. A converging point of rays on a plane formed by the normal line of the optical disk and a radial line is formed at a position in the front of a converging point of rays formed on a plane perpendicular to it. That is, the quantities of astigmatism are added. The quantity of astigmatism caused in this case is shown in FIG. 2. Due to the quantity of astigmatism shown in FIG. 2, it is impossible to provide a sufficiently high performance.

DETAILED DESCRIPTION OF THE INVENTION

In the optical system used for the recording and reproducing device for recording and reproducing optical information on a recording medium such as an optical disk, it is common to use an objective lens composed of a perfect aplanat aspherical single lens on which coma and spherical aberration are compensated in a good condition. In this case, concerning aberration caused by the generation of image height in tracking, astigmatism occurs mainly. This astigmatism is increased in the manner of a quadratic function of the image height y. Accordingly, a quantity of astigmatism generated at the image height of 70% of the maximum image height Y in tracking is approximately half of the quantity of astigmatism generated at the maximum image height Y. In this case, the astigmatism caused by tracking occurs as follows. A converging point of rays on a plane formed by the normal line of the optical disk and a radial line is formed at a position in the front of a converging point of rays formed on a plane perpendicular to it. That is, the converging point is formed on the objective lens side.

Slippage of the light emitting point of the semiconductor laser, that is, the quantity of astigmatism (RMS value) $AS_{LASER}$ based on the astigmatic difference is expressed by the following equation. In this case, unit of the value $AS_{LASER}$ is $\lambda$ which represents a wave-length.

$$AS_{LASER} = \frac{1}{\sqrt{6}} \times \frac{1}{2} \cdot N' \cdot \theta'^2 \times \frac{N'}{N} \cdot m'^2 \cdot \Delta X/\lambda$$

$\theta' = \sin^{-1}(NA')$

NA': Numerical aperture of the objective lens on the image side

N': Index of refraction of the medium on the image side

N: Index of refraction of the medium on the object side m': Lateral magnification of the objective lens $\Delta X$: Half of the astigmatic difference of the semiconductor laser (μm)

$\lambda$: Wave-length of the semiconductor laser (μm)

The divergent angle of the semiconductor laser in a direction parallel to the hetero-joint plane is different from the divergent angle of the semiconductor laser in a direction perpendicular to the hetero-joint plane. The divergent angle parallel to the joint plane is smaller than the divergent angle perpendicular to the joint plane. Usually, the elliptical luminous flux is made to be a circular luminous flux when it passes through a circular opening. In a direction perpendicular to the joint plane which is more affected by an eclipse, strength of the diffraction ring is increased. In the case of an optical disk, when this diffraction ring coincides with the adjacent track, the problem of cross talk occurs.

In order to avoid this problem, the following condition must be maintained. A plane formed between the moving direction perpendicular to the optical axis for tracking and the optical axis forms an angle in the range of ±45° with respect to the hetero-joint plane. Further, it is preferable that a direction parallel to the joint plane of the semiconductor laser coincides with the radial direction of the optical disk, that is, a direction parallel to the joint plane of the semiconductor laser coincides with the track adjoining direction. It is preferable to determine a relation between the semiconductor laser and the optical disk so that the above condition can be satisfied.

Due to the foregoing, the angle formed between the direction parallel to the hetero-joint plane of the semiconductor laser and the radial direction of the optical disk is maintained to be in a range of ±45°, or the angle coincides with 45°. That is, the converging point of rays on a plane formed by the normal line of the optical disk and a radial line is formed at a position in the front of the converging point of rays formed on a plane perpendicular to it. That is, the converging point is formed on the objective lens side.

The converging point of rays on a plane formed by the normal line of the optical disk and a radial line is formed at a position in the front of the converging point of rays formed on a plane perpendicular to it, that is, the converging point is formed on the objective lens side. Accordingly, the astigmatism based on the astigmatic difference of the semiconductor laser and the astigmatism caused by tracking are totaled, which is not preferable from the viewpoint of practical use.

The present invention is composed as follows. Astigmatism is previously generated on the objective lens. The converging point of rays on a plane formed by the normal line of the optical disk and a radial line is formed at a position in the rear of the converging point of rays formed on a plane perpendicular to it. In this way, the astigmatism based on the semiconductor laser and the astigmatism caused by tracking are compensated to each other. Therefore, the entire system is composed in such a manner that the astigmatism is excellently compensated even when the objective lens is moved from the optical axis in the process of tracking.

In this case, the composed astigmatism will be explained below, which is the astigmatism in which the astigmatism based on the semiconductor laser and the astigmatism caused by tracking are composed.

Astigmatism is a aberration, which has a periodicity of 180° rotation. Accordingly, when quantities of the astigmatism are the same and directions of the astigmatism are perpendicular to each other, the composed astigmatism becomes 0.

Figure 3:
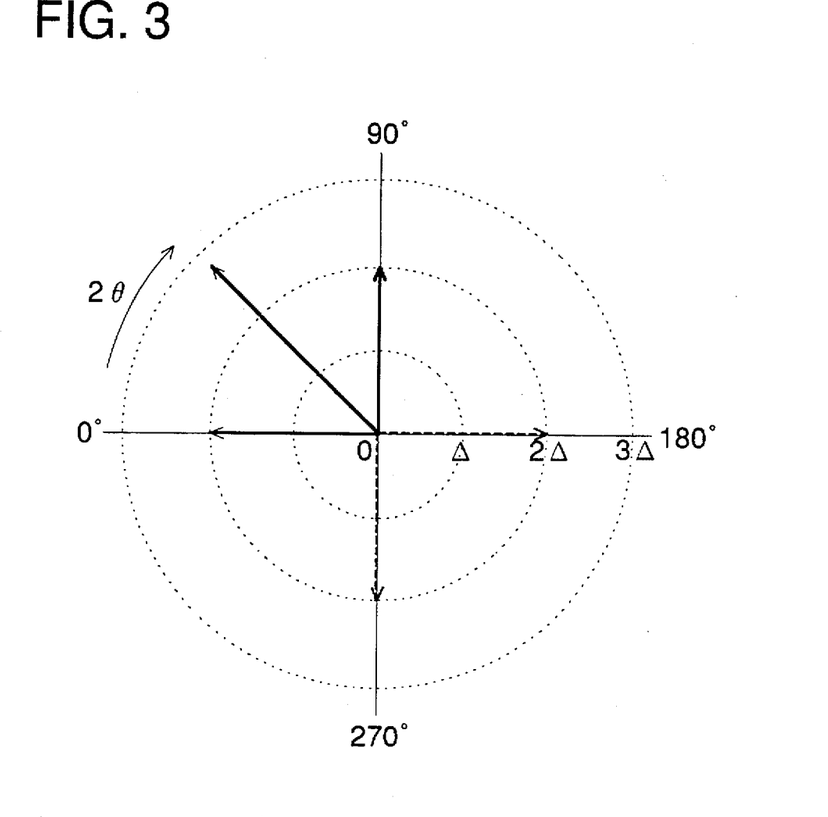
FIG. 3 is a schematic illustration for explaining the astigmatism in which the astigmatism caused by a semiconductor laser and the astigmatism caused by tracking are composed.

In this case, consideration is given to above fact using a circular graph. As illustrated in FIG. 3, a vector sum is set up.

In FIG. 3, Δ represents a quantity of the astigmatism, and θ represents a direction of the astigmatism.

In this case, the astigmatism will be discussed under the following condition. A quantity of the astigmatism based on the semiconductor laser is 2Δ, and its direction is θ=45° (in FIG. 3, 2θ=90°). A quantity of the astigmatism caused by tracking is 2Δ, and its direction is θ=0° (in FIG. 3, 2θ=0°). Then, the quantity of the composed astigmatism in which both are composed is 2√2Δ, and the direction is θ=22.5° (in FIG. 3, 2θ=45°).

Accordingly, in order to compensate the astigmatism based on the semiconductor laser and the astigmatism caused by tracking, the astigmatism, the quantity of which is 2Δ, and the direction of which is θ=135° (in FIG. 3, 2θ=270°), and the astigmatism, the quantity of which is 2Δ, and the direction of which is θ=90° (in FIG. 3, 2θ=180°), are composed to each other, and the thus composed astigmatism may be given to the objective lens. In this case, consideration should be given to that the quantity of astigmatism based on the semiconductor laser is not changed by tracking, however, the quantity of astigmatism caused by tracking is changed in accordance with a quantity of tracking. Accordingly, in order to compensate the astigmatism in all the tracking region, operation is conducted as follows. For example, the maximum quantity of astigmatism caused by tracking is 2Δ, and the direction of astigmatism is θ=135° (in FIG. 3, 2θ=270°). The maximum quantity of astigmatism is Δ which is half of the quantity of astigmatism caused by tracking, and the direction of astigmatism is θ=90° (in FIG. 3, 2θ=180°). When the astigmatism in which the above 2 types of astigmatism are composed is given to the objective lens, the astigmatism caused by the semiconductor lens can be completely compensated. Further, the quantity of fluctuation of the astigmatism in the case where compensation has been made is not more than ½ of the quantity of fluctuation of the astigmatism in the case where compensation has not been made. Further, the quantity of the astigmatism is made to be 0 when the quantity of tracking is 70% with respect to the maximum quantity of tracking. It is possible to provide a recording and reproducing device for recording and reproducing optical information recorded on a recording medium in which the compensation can be made in the manner described above.

In the case where the semiconductor laser is installed in such a manner that the direction parallel to the joint plane of the semiconductor laser coincides with the radial direction of the optical disk, that is, the tracking direction, a quantity of the astigmatism, in which the astigmatism based on the semiconductor laser and the astigmatism caused by tracking are composed to each other, is expressed by the following equation.

$$AS_{SUM} = \frac{1}{\sqrt{6}} \times \frac{1}{2} \cdot N' \cdot \theta'^2 \times \frac{N'}{N} \cdot m'^2 \cdot \Delta X/\lambda + \Delta AS_{(kY)}$$

$\theta' = \sin^{-1}(NA')$

NA': Numerical aperture of the objective lens on the image side

N': Index of refraction of the medium on the image side

N: Index of refraction of the medium on the object side m': Lateral magnification of the objective lens ΔX: Half of the astigmatic difference of the semiconductor laser (μm)

λ: Wave-length of the semiconductor laser (μm)

Y: Maximum image height by tracking $\Delta AS_{(kY)}$: Quantity of the astigmatism (WEF·λrms) caused by tracking at the image height kY kY: (k/10)×100% image height of the maximum image height Y by tracking (mm)

$AS_{SUM}$: Quantity of the composed astigmatism (WEF·λrms) in which the quantity of astigmatism caused by the semiconductor laser at the image height kY and the quantity of astigmatism caused by tracking are composed Accordingly, when the quantity of on-axis astigmatism ($AS_{LENS}$) of the objective lens is made to be equal to the quantity of the composed astigmatism $AS_{SUM}$ at the predetermined image height kY, it is possible to make the quantity of the astigmatism at the predetermined image height kY to be 0. When the predetermined image height kY is set in a range from 0.30 Y to 0.95 Y, it is possible to excellently compensate the astigmatism in the overall range of tracking.

With reference to FIGS. 4 to 9, an example of the present invention will be explained below.

Figure 4:
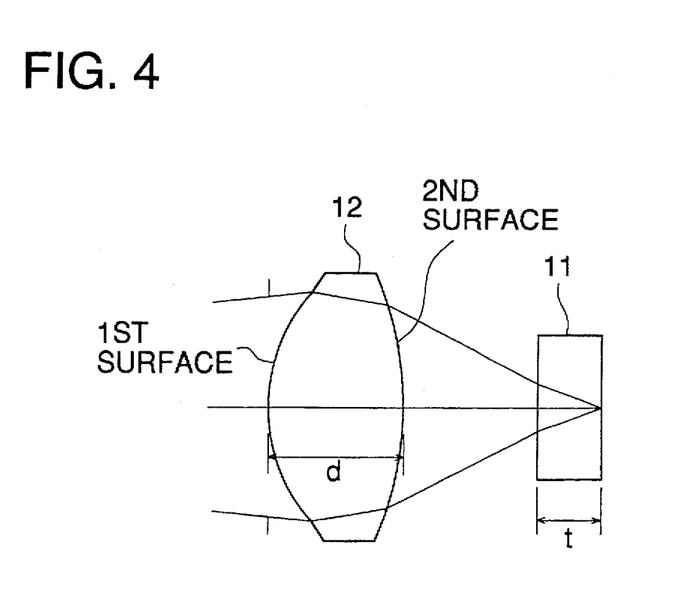
FIG. 4 is a view showing an optical system of the example.

FIG. 4 is a view showing the optical system of the example. Numeral 11 is a cover glass of the optical disk, and numeral 12 is an objective lens.

Aspherical shapes of the objective lens surfaces of this example on the sides of the light source and the image are expressed by the following equations on a rectangular coordinates in which the top of the surface is defined as the origin and the optical axis is defined as the X-axis.

$$X = \frac{C\phi^2}{1+\sqrt{1-(1+k)C^2\phi^2}} + \sum_i A_i \phi^{Pi}$$

$$\phi = \sqrt{Y^2 + Z^2}, \quad C = \frac{1}{r}$$

where k is a cone coefficient, Ai is an aspherical face coefficient, and Pi is the power of a number of an aspherical surface.

In this case, d is an on-axis thickness of the objective lens, n is a refraction factor of the objective lens at 780 nm, and ν is an Abbe's number on line d of the objective lens.

FIRST EXAMPLE

Wave-length of a semiconductor laser λ=0.78 (μm)

Astigmatic difference of a semiconductor laser 2ΔX=10 (μm)

Numerical aperture of an objective lens NA'=0.45

Lateral magnification of an objective lens m=−1/5.5

Refraction factor of the medium on the image side N'=1

Refraction factor of the medium on the object side N'=1

Maximum image height by tracking Y=0.1 (mm)

Cover glass thickness of an optical disk t=1.2 (mm)

Cover glass refraction factor of an optical disk n=1.55

Data of an objective lens are described as follows.

$r_1 = +2.570$ $r_2 = -4.362$ $d_1 = 2.50$ $n_1 = 1.48595$ $\nu = 55.0$

The cone factor, the aspherical coefficient and the power of a number of an aspherical surface are determined as follows.

TABLE 1

| | | |
|---|---|---|
| First Face | k = −2.5423 | |
| | $A_1 = +1.2348 \times 10^{-2}$ | $P_1 = 4.0$ |
| | $A_2 = -1.5378 \times 10^{-3}$ | $P_2 = 6.0$ |
| | $A_3 = +1.6980 \times 10^{-4}$ | $P_3 = 8.0$ |
| | $A_4 = -2.1100 \times 10^{-5}$ | $P_4 = 10.0$ |
| Second Face | k = −1.0368 × 10 | |
| | $A_1 = -4.1699 \times 10^{-3}$ | $P_1 = 4.0$ |
| | $A_2 = +8.0548 \times 10^{-4}$ | $P_2 = 6.0$ |
| | $A_3 = -2.2768 \times 10^{-4}$ | $P_3 = 8.0$ |
| | $A_4 = +1.5118 \times 10^{-5}$ | $P_4 = 10.0$ |

A quantity of astigmatism $AS_{LASER}$ is expressed as follows.

$$AS_{LASER} = \frac{1}{\sqrt{6}} \times \frac{1}{2} \cdot N' \cdot \theta'^2 \times \frac{N'}{N} \cdot m'^2 \cdot \Delta X/\lambda = 0.009 (\lambda rms)$$

$\Delta AS_{(0.4Y)} = 0.007$ (λrms)

$\Delta AS_{(0.7Y)} = 0.019$ (λrms)

$\Delta AS_{(0.9Y)} = 0.031$ (λrms)

$0.016 \leq AS_{LENS} \leq 0.040$

Figure 5:
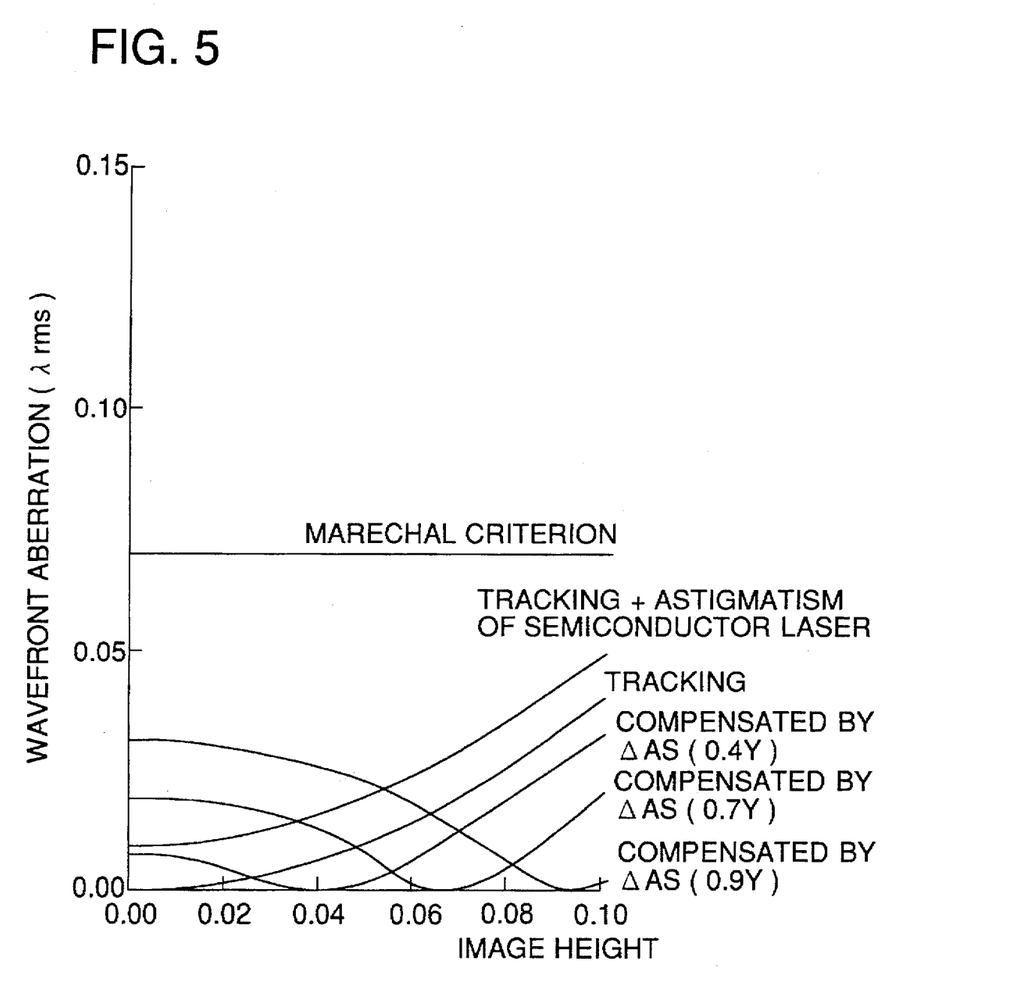
FIG. 5 is a view showing the astigmatism of the first example.

FIG. 5 is a view showing the astigmatism of this example. The drawing shows the quantity of wavefront aberration caused by a tracking. The horizontal line indicates image height and the vertical line indicates wavefront aberration. In the drawing, the line with TRACKING represents the quantity of wavefront aberration generated by only a tracking without considering the astigmatism of the semiconductor laser. The line with TRACKING+ASTIGMATISM OF SEMICONDUCTOR LASER represents the quantity of wavefront aberration generated by a tracking when the astigmatism of the semiconductor laser is included. Each line with COMPENSATED BY ΔAS (0.4 Y), ΔAS (0.7 Y), AND ΔAS (0.9 Y) represents the quantity of wavefront aberration when the line with TRACKING+ASTIGMATISM OF SEMICONDUCTOR LASER mentioned above is compensated by each of ΔAS (0.4 Y), ΔAS (0.7 Y), AND ΔAS (0.9 Y) related to the present invention.

As clearly shown by the lines with COMPENSATED BY ΔAS (0.4 Y), ΔAS (0.7 Y), AND ΔAS (0.9 Y), the performance with a sufficient margin against Marechal Criterion which is a limit for reading in a normal condition, can be achieved.

The same expanation as that indicated above can be applied to FIGS. 6, 7, 8 and 9 which will be discussed in the later stage.

SECOND EXAMPLE

Wave-length of a semiconductor laser λ=0.78 (μm)

Astigmatic difference of a semiconductor laser 2ΔX=20 (μm)

Numerical aperture of an objective lens NA'=0.45

Lateral magnification of an objective lens m=−1/5.5

Refraction factor of the medium on the image side N'=1

Refraction factor of the medium on the object side N'=1

Maximum image height by tracking Y=0.1 (mm)

Cover glass thickness of an optical disk t=1.2 (mm)

Cover glass refraction factor of an optical disk n=1.55

Data of an objective lens are described as follows.

$r_1 = +2.570$ $r_2 = -4.362$ $d_1 = 2.50$ $n_1 = 1.48595$ $\nu = 55.0$

The cone factor, the aspherical coefficient and the power of a number of an aspherical surface are determined as follows.

TABLE 2

| | | |
|---|---|---|
| First Face | k = −2.5423 | |
| | $A_1 = +1.2348 \times 10^{-2}$ | $P_1 = 4.0$ |
| | $A_2 = -1.5378 \times 10^{-3}$ | $P_2 = 6.0$ |
| | $A_3 = +1.6980 \times 10^{-4}$ | $P_3 = 8.0$ |
| | $A_4 = -2.1100 \times 10^{-5}$ | $P_4 = 10.0$ |
| Second Face | k = −1.0368 × 10 | |
| | $A_1 = -4.1699 \times 10^{-3}$ | $P_1 = 4.0$ |
| | $A_2 = +8.0548 \times 10^{-4}$ | $P_2 = 6.0$ |
| | $A_3 = -2.2768 \times 10^{-4}$ | $P_3 = 8.0$ |
| | $A_4 = +1.5118 \times 10^{-5}$ | $P_4 = 10.0$ |

A quantity of astigmatism $AS_{LASER}$ is expressed as follows.

$$AS_{LASER} = \frac{1}{\sqrt{6}} \times \frac{1}{2} \cdot N' \cdot \theta'^2 \times \frac{N'}{N} \cdot m^2 \cdot \Delta X/\lambda = 0.019(\lambda rms)$$

$\Delta AS_{(0.4Y)} = 0.007$ ($\lambda$rms)

$\Delta AS_{(0.7Y)} = 0.019$ ($\lambda$rms)

$\Delta AS_{(0.9Y)} = 0.031$ ($\lambda$rms)

$0.026$ ($\lambda$rms) $\leq AS_{LENS} \leq 0.050$ ($\lambda$rms)

Figure 6:
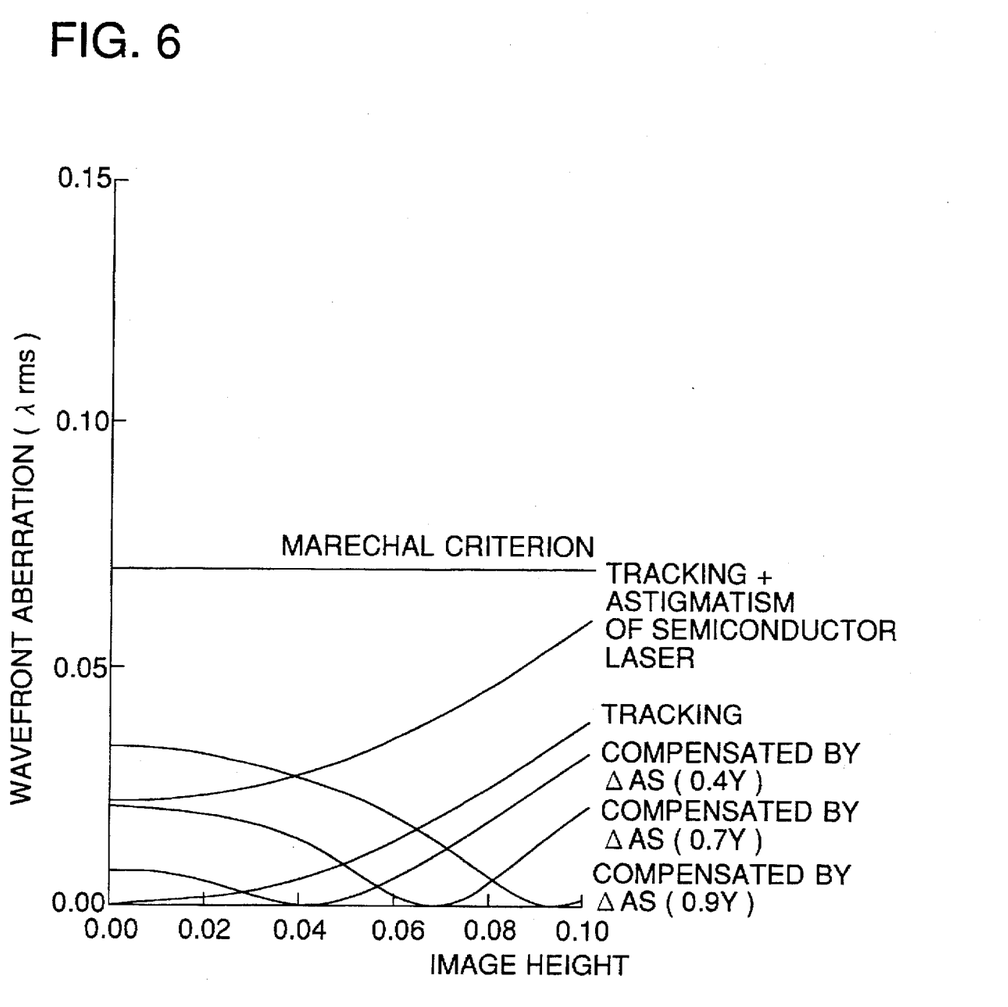
FIG. 6 is a view showing the astigmatism of the second example.

FIG. 6 is a view showing the astigmatism of this example.

THIRD EXAMPLE

Wave-length of a semiconductor laser $\lambda=0.78$ (μm)
Astigmatic difference of a semiconductor laser $2\Delta X=10$ (μm)
Numerical aperture of an objective lens NA'=0.45
Lateral magnification of an objective lens m=−1/5.5
Refraction factor of the medium on the image side N'=1
Refraction factor of the medium on the object side N'=1
Maximum image height by tracking Y=0.1 (mm)
Cover glass thickness of an optical disk t=1.2 (mm)
Cover glass refraction factor of an optical disk n=1.55
Data of an objective lens are described as follows.

$r_1=+2.280$ $r_2=-3.603$ $d_1=2.50$ $n_1=1.48595$ $v=55.0$

The cone factor, the aspherical coefficient and the power of a number of an aspherical surface are determined as follows.

TABLE 3

| First Face | $k = -2.0931$ | |
|---|---|---|
| | $A_1 = +1.3143 \times 10^{-2}$ | $P_1 = 4.0$ |
| | $A_2 = -1.5401 \times 10^{-3}$ | $P_2 = 6.0$ |
| | $A_3 = +1.5746 \times 10^{-4}$ | $P_3 = 8.0$ |
| | $A_4 = -2.0157 \times 10^{-5}$ | $P_4 = 10.0$ |
| Second Face | $k = -9.1686$ | |
| | $A_1 = -4.1871 \times 10^{-3}$ | $P_1 = 4.0$ |
| | $A_2 = +9.3262 \times 10^{-4}$ | $P_2 = 6.0$ |
| | $A_3 = -2.5020 \times 10^{-4}$ | $P_3 = 8.0$ |
| | $A_4 = +1.9118 \times 10^{-5}$ | $P_4 = 10.0$ |

A quantity of astigmatism $AS_{LASER}$ is expressed as follows.

$$AS_{LASER} = \frac{1}{\sqrt{6}} \times \frac{1}{2} \cdot N' \cdot \theta'^2 \times \frac{N'}{N} \cdot m^2 \cdot \Delta X/\lambda = 0.011(\lambda rms)$$

$\Delta AS_{(0.4Y)} = 0.014$ ($\lambda$rms)

$\Delta AS_{(0.7Y)} = 0.032$ ($\lambda$rms)

$\Delta AS_{(0.9Y)} = 0.048$ ($\lambda$rms)

$0.025$ ($\lambda$rms) $\leq AS_{LENS} \leq 0.059$ ($\lambda$rms)

Figure 7:
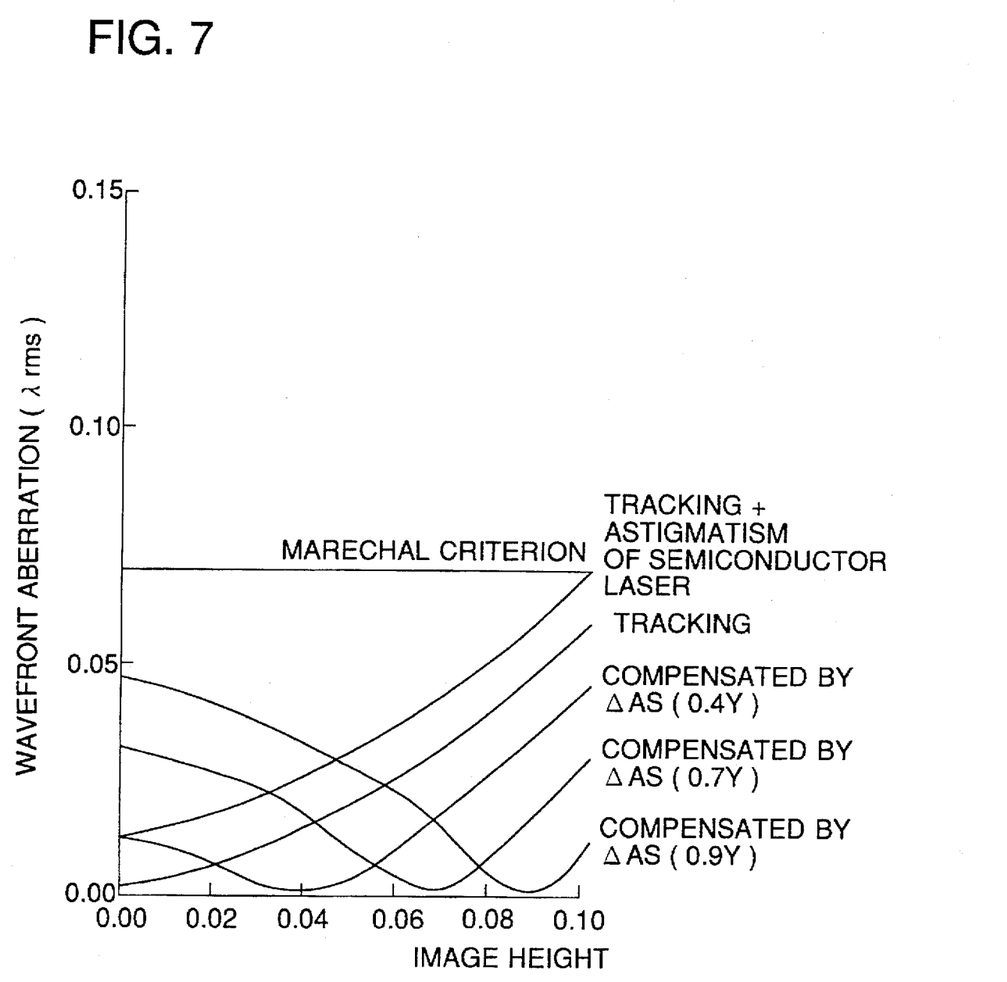
FIG. 7 is a view showing the astigmatism of the third example.

FIG. 7 is a view showing the astigmatism of this example.

FOURTH EXAMPLE

Wave-length of a semiconductor laser $\lambda=0.78$ (μm)
Astigmatic difference of a semiconductor laser $2\Delta X=20$ (μm)
Numerical aperture of an objective lens NA'=0.45
Lateral magnification of an objective lens m=−1/5.5
Refraction factor of the medium on the image side N'=1
Refraction factor of the medium on the object side N'=1
Maximum image height by tracking Y=0.1 (mm)
Cover glass thickness of an optical disk t=1.2 (mm)
Cover glass refraction factor of an optical disk n=1.55
Data of an objective lens are described as follows.

$r_1=+2.280$ $r_2=-3.603$ $d_1=2.50$ $n_1=1.48595$ $v=55.0$

The cone factor, the aspherical coefficient and the power of a number of an aspherical surface are determined as follows.

TABLE 4

| First Face | $k = -2.0931$ | |
|---|---|---|
| | $A_1 = +1.3143 \times 10^{-2}$ | $P_1 = 4.0$ |
| | $A_2 = -1.5401 \times 10^{-3}$ | $P_2 = 6.0$ |
| | $A_3 = +1.5746 \times 10^{-4}$ | $P_3 = 8.0$ |
| | $A_4 = -2.0157 \times 10^{-5}$ | $P_4 = 10.0$ |
| Second Face | $k = -9.1686$ | |
| | $A_1 = -4.1871 \times 10^{-3}$ | $P_1 = 4.0$ |
| | $A_2 = +9.3262 \times 10^{-4}$ | $P_2 = 6.0$ |
| | $A_3 = -2.5020 \times 10^{-4}$ | $P_3 = 8.0$ |
| | $A_4 = +1.9118 \times 10^{-5}$ | $P_4 = 10.0$ |

A quantity of astigmatism $AS_{LASER}$ is expressed as follows.

$$AS_{LASER} = \frac{1}{\sqrt{6}} \times \frac{1}{2} \cdot N' \cdot \theta'^2 \times \frac{N'}{N} \cdot m^2 \cdot \Delta X/\lambda = 0.023(\lambda rms)$$

$\Delta AS_{(0.4Y)} = 0.014$ ($\lambda$rms)

$\Delta AS_{(0.7Y)} = 0.032$ ($\lambda$rms)

$\Delta AS_{(0.9Y)} = 0.048$ ($\lambda$rms)

$0.037$ ($\lambda$rms) $\leq AS_{LENS} \leq 0.071$ ($\lambda$rms)

Figure 8:
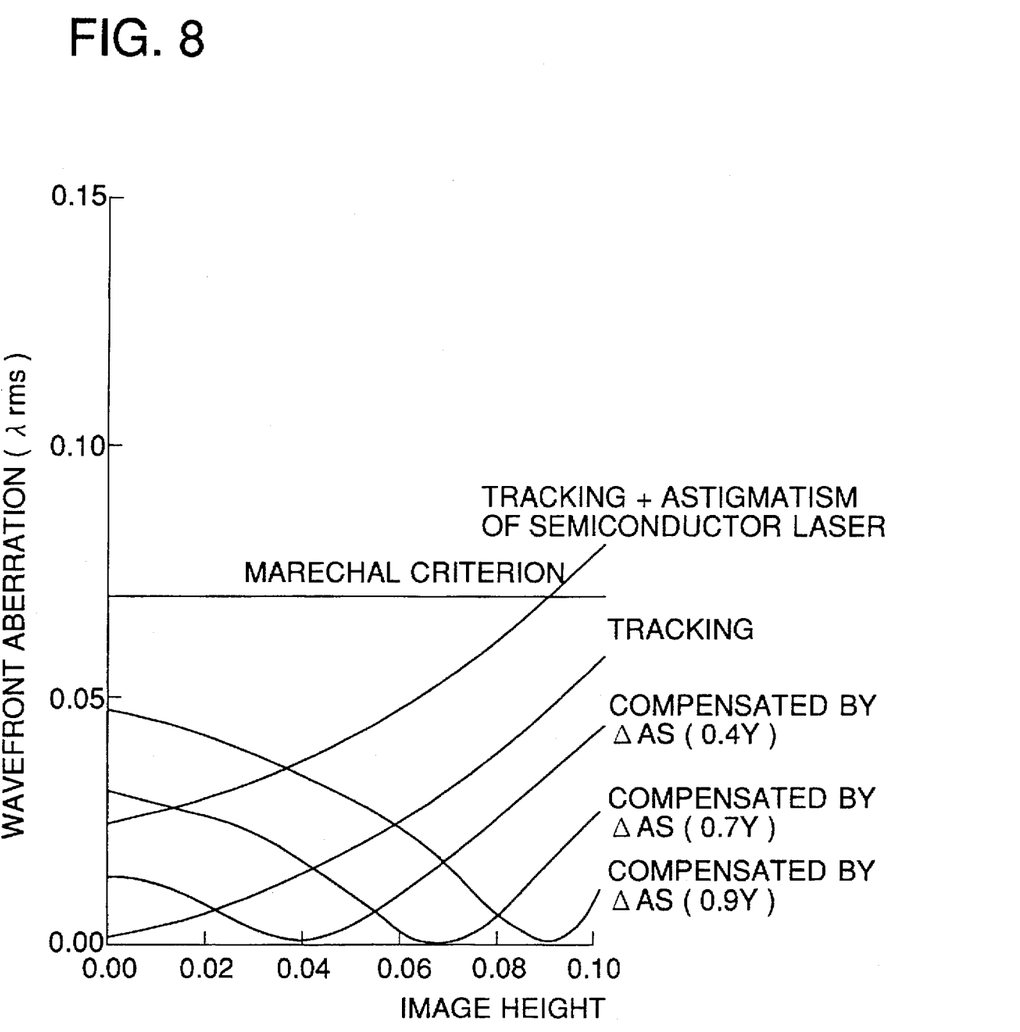
FIG. 8 is a view showing the astigmatism of the fourth example.

FIG. 8 is a view showing the astigmatism of this example.

FIFTH EXAMPLE

Wave-length of a semiconductor laser $\lambda=0.78$ (μm)
Astigmatic difference of a semiconductor laser $2\Delta X=0$ (μm)
Numerical aperture of an objective lens NA'=0.45
Lateral magnification of an objective lens m=−1/5.5
Refraction factor of the medium on the image side N'=1
Refraction factor of the medium on the object side N'=1
Maximum image height by tracking Y=0.1 (mm)
Cover glass thickness of an optical disk t=1.2 (mm)
Cover glass refraction factor of an optical disk n=1.55
Data of an objective lens are described as follows.

$r_1=+2.280$ $r_2=-3.603$ $d_1 = 2.50$ $n_1 = 1.48595$ $v = 55.0$

The cone factor, the aspherical coefficient and the power of a number of an aspherical surface are determined as follows.

TABLE 5

| First Face | $k = -2.0931$ | |
|---|---|---|
| | $A_1 = +1.3143 \times 10^{-2}$ | $P_1 = 4.0$ |
| | $A_2 = -1.5401 \times 10^{-3}$ | $P_2 = 6.0$ |
| | $A_3 = +1.5746 \times 10^{-4}$ | $P_3 = 8.0$ |
| | $A_4 = -2.0157 \times 10^{-5}$ | $P_4 = 10.0$ |
| Second Face | $k = -9.1686$ | |
| | $A_1 = -4.1871 \times 10^{-3}$ | $P_1 = 4.0$ |
| | $A_2 = +9.3262 \times 10^{-4}$ | $P_2 = 6.0$ |
| | $A_3 = -2.5020 \times 10^{-4}$ | $P_3 = 8.0$ |
| | $A_4 = +1.9118 \times 10^{-5}$ | $P_4 = 10.0$ |

A quantity of astigmatism $AS_{LASER}$ is expressed as follows.

$$AS_{LASER} = \frac{1}{\sqrt{6}} \times \frac{1}{2} \cdot N' \cdot \theta'^2 \times \frac{N'}{N} \cdot m'^2 \cdot \Delta X/\lambda = 0(\lambda rms)$$

Figure 9:
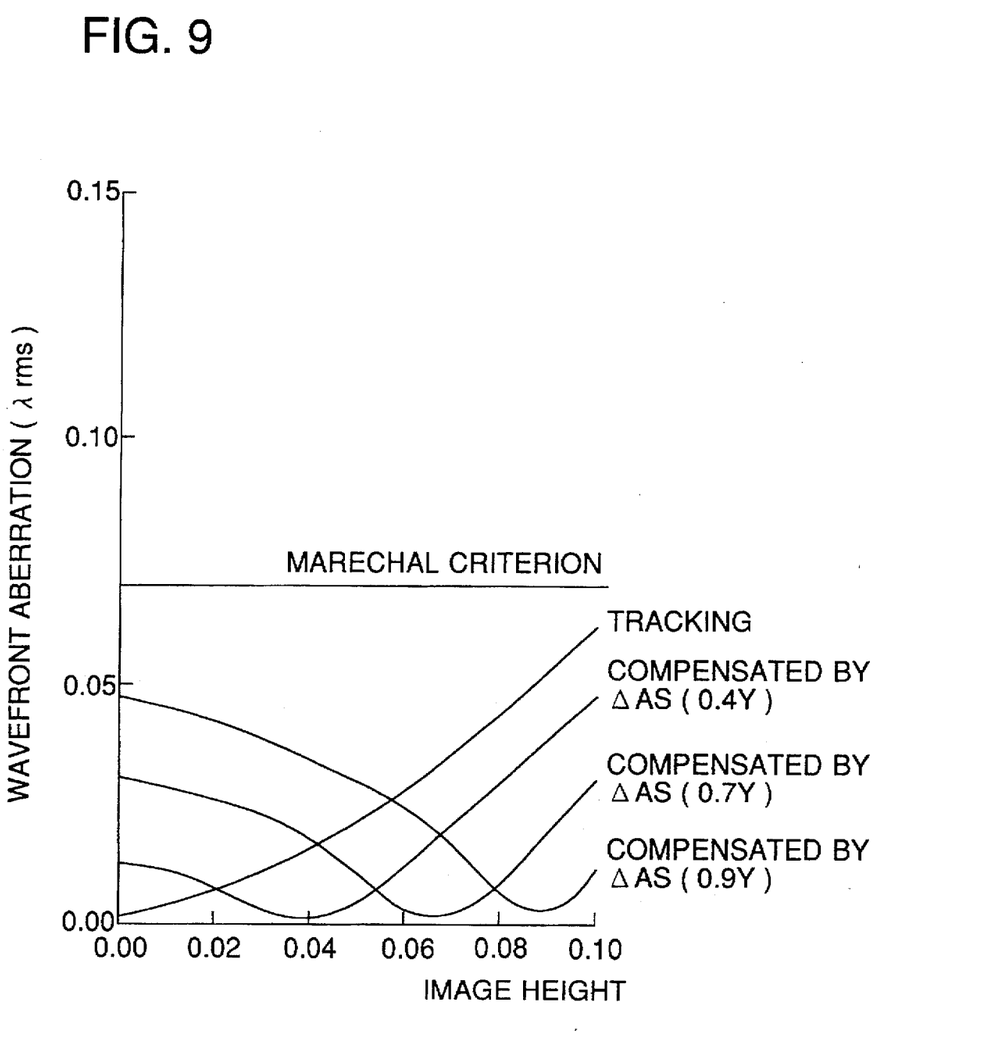
FIG. 9 is a view showing the astigmatism of the fifth example.

$\Delta AS_{(0.4Y)} = 0.014 \ (\lambda rms)$ $\Delta AS_{(0.7Y)} = 0.032 \ (\lambda rms)$ $\Delta AS_{(0.9Y)} = 0.048 \ (\lambda rms)$ $0.014 \ (\lambda rms) \leq AS_{LENS} \leq 0.048 \ (\lambda rms)$ FIG. 9 is a view showing the astigmatism of this example.

According to the recording and reproducing device for recording and reproducing optical information on a recording medium of any of the Structures 1 to 13 of the present invention, even when the objective lens is moved from the optical axis in the process of tracking, it is possible to excellently compensate the astigmatism.

According to the objective lens used for recording and reproducing optical information on a recording medium of the Structure 14 of the present invention, it is possible to excellently compensate the astigmatism in the process of tracking.

What is claimed is:

1. A device for recording or reproducing on an optical information recording medium, the device comprising:

(a) a light source composed of a semiconductor laser for emitting a divergent luminous flux;

(b) an objective lens having an optical axis, for receiving the divergent luminous flux and for converging the divergent luminous flux onto the optical information recording medium; and (c) tracking means for tracking a converged luminous flux on the optical information recording medium by moving the objective lens in a direction perpendicular to the optical axis, wherein the objective lens has an astigmatism so that a quantity of a total astigmatism of a wave front emitted from the objective lens shows a minimum value at a position where the objective lens is moved in the direction perpendicular to the optical axis by a tracking operation of the tracking means.

2. The device of claim 1, wherein the objective lens is an infinite conjugate type of a bi-aspherical single lens made by molding.

3. The device of claim 2, wherein the objective lens is composed so that the astigmatism of the objective lens is generated when a section of at least one surface of planes of the objective lens is different from a section perpendicular to said one of the planes.

4. The device of claim 2, wherein the astigmatism of the objective lens is generated by a birefringence caused by a resin molding of the objective lens.

5. The device of claim 2, wherein the astigmatism of the objective lens is generated by a birefringence caused by a resin molding of the objective lens, and the astigmatism of the objective lens is generated when a section of at least one surface of planes of the objective lens is different from a section perpendicular to said one of the planes.

6. The device of claim 1, wherein the objective lens is rotated around the optical axis so that a rotational position can be set.

7. The device of claim 1, wherein the objective lens is an infinite conjugate type of a bi-aspherical single positive lens and has a convex surface facing the light source;

wherein a plane defined by a moving direction of the objective lens perpendicular to the optical axis for the tracking operation and the optical axis of the objective lens, is in substantially the same plane as a hetero-joint plane of the semiconductor laser;

wherein a quantity of on-axis astigmatism of the objective lens satisfies the following expression;

and wherein the objective lens is assembled in a direction so that an astigmatism of the objective lens cancels an astigmatism generated by the semiconductor laser and a tracking operation, $$\frac{1}{\sqrt{6}} \times \frac{1}{2} \cdot N' \cdot \theta'^2 \times \frac{N'}{N} \cdot m'^2 \cdot \Delta X/\lambda + \Delta AS_{(0.4Y)} \leq AS_{LENS} \leq$$

$$\frac{1}{\sqrt{6}} \times \frac{1}{2} \cdot N' \cdot \theta'^2 \times \frac{N'}{N} \cdot m'^2 \cdot \Delta X/\lambda + \Delta AS_{(0.9Y)}$$

where NA' represents a numerical aperture of image space of the objective lens, $\theta'$ represents $\sin^{-1}$ (NA'), N' represents a refractive index of a medium of image space, N represents a refractive index of a medium of object space, m' represents a lateral magnification of the objective lens, $\Delta X$ represents a half an astigmatic difference (μm) of the semiconductor laser, $\lambda$ represents a wavelength (μm) of the semiconductor laser, Y represents a maximum image height (mm) generated by the tracking operation, $\Delta AS_{(0.4\ Y)}$ and $\Delta AS_{(0.9\ Y)}$ represent quantities of astigmatism (WEF·λrms) respectively generated by the tracking operation at the image heights of 0.4 Y and 0.9 Y, and $AS_{LENS}$ represents a peculiar on-axis astigmatism (WEF·λrms) of the objective lens.

8. The device of claim 1, wherein the position is in a tracking range of not less than 0.30 Y and not more than 0.95 Y, wherein Y represents a maximum image height of the objective lens when the objective lens has a maximum amount of tracking.

9. The device of claim 1, wherein the position is in a tracking range of not less than 0.4 Y and not more than 0.90 Y, wherein Y represents a maximum image height of the objective lens when the objective lens has a maximum amount of tracking.

10. The device of claim 1, wherein the position is in a tracking range of not less than 0.60 Y and not more than 0.80 Y, wherein Y represents a maximum image height of the objective lens when the objective lens has a maximum amount of tracking.

11. The device of claim 1, wherein the semiconductor laser has an astigmatic difference.

12. The device of claim 11, wherein a plane formed between a radial line perpendicular to the optical axis in which the objective lens is moved for the tracking operation and the optical axis of the objective lens, is parallel to a hetero-joint plane of the semiconductor laser.

13. The device of claim 1, wherein the objective lens is an infinite conjugate type bi-aspherical single lens.

14. The device of claim 1, wherein the objective lens is made by molding.

15. The device of claim 1, wherein a first section of at least one surface of the objective lens is different from a second section of the surface perpendicular to the first section so as to generate the astigmatism of the objective lens.

16. The device of claim 1, wherein the objective lens has a birefringence caused by a resin molding so as to generate the astigmatism of the objective lens.

17. The device of claim 1, wherein a plane defined by a moving direction of the objective lens perpendicular to the optical axis for the tracking operation and the optical axis of the objective lens, is in substantially the same plane as a hereto-joint plane of the semiconductor laser.

18. The device of claim 17, wherein a quantity of on-axis astigmatism of the objective lens satisfies the following expression:

$$\frac{1}{\sqrt{6}} \times \frac{1}{2} \cdot N' \cdot \theta'^2 \times \frac{N'}{N} \cdot m'^2 \cdot \Delta X/\lambda + \Delta AS_{(0.4Y)} \leq AS_{LENS} \leq$$

$$\frac{1}{\sqrt{6}} \times \frac{1}{2} \cdot N' \cdot \theta'^2 \times \frac{N'}{N} \cdot m'^2 \cdot \Delta X/\lambda + \Delta AS_{(0.9Y)}$$

where NA' represents a numerical aperture of image space of the objective lens, θ' represents $\sin^{-1}$ (NA'), N' represents a refractive index of a medium of image space, N represents a refractive index of a medium of object space, m' represents a lateral magnification of the objective lens, ΔX represents a half an astigmatic difference (μm) of the semiconductor laser, λ represents a wavelength (μm) of the semiconductor laser, Y represents a maximum image height (mm) generated by the tracking operation, $\Delta AS_{(0.4\ Y)}$ and $\Delta AS_{(0.9\ Y)}$ represent quantities of astigmatism (WEF·λrms) respectively generated by the tracking operation at the image heights of 0.4 Y and 0.9 Y, and $AS_{LENS}$ represents a peculiar on-axis astigmatism (WEF·λrms) of the objective lens.

19. A device for recording or reproducing on an optical information recording medium, the device comprising:

(a) a light source including a semiconductor laser for emitting a divergent luminous flux;

(b) an infinite conjugate type of an objective lens having an optical axis, for receiving the divergent luminous flux and for converging the divergent luminous flux onto the optical information recording medium, the objective lens having a convex surface facing the light source and being a bi-aspherical single positive lens; and (c) tracking means for tracking a converged luminous flux on the optical information recording medium by moving the objective lens in a direction perpendicular to the optical axis, wherein a plane defined by a moving direction of the objective lens perpendicular to the optical axis for the tracking operation and the optical axis, is in substantially the same plane as a hetero-joint plane of the semiconductor laser;

wherein a quantity of on-axis astigmatism of the objective lens satisfies the following expression;

and wherein the objective lens is assembled in a direction so that an astigmatism of the objective lens cancels an astigmatism generated by the semiconductor laser and a tracking operation, $$\frac{1}{\sqrt{6}} \times \frac{1}{2} \cdot N' \cdot \theta'^2 \times \frac{N'}{N} \cdot m'^2 \cdot \Delta X/\lambda + \Delta AS_{(0.4Y)} \leq AS_{LENS} \leq$$

$$\frac{1}{\sqrt{6}} \times \frac{1}{2} \cdot N' \cdot \theta'^2 \times \frac{N'}{N} \cdot m'^2 \cdot \Delta X/\lambda + \Delta AS_{(0.9Y)}$$

where NA' represents a numerical aperture of image space of the objective lens, θ' represents $\sin^{-1}$ (NA'), N' represents a refractive index of a medium of image space, N represents a refractive index of a medium of object space, m' represents a lateral magnification of the objective lens, ΔX represents a half an astigmatic difference (μm) of the semiconductor laser, λ represents a wavelength (μm) of the semiconductor laser, Y represents a maximum image height (mm) generated by the tracking operation, $\Delta AS_{(0.4\ Y)}$ and $\Delta AS_{(0.9\ Y)}$ represent quantities of astigmatism (WEF·λrms) respectively generated by the tracking operation at the image heights of 0.4 Y and 0.9 Y, and $AS_{LENS}$ represents a peculiar on-axis astigmatism (WEF·λrms) of the objective lens.

\* \* \* \* \*